June 8, 1954  
I. C. STEVEN  
2,680,567  
TRACTION DEVICE FOR USE WITH VEHICLE TIRES  
Filed July 22, 1952
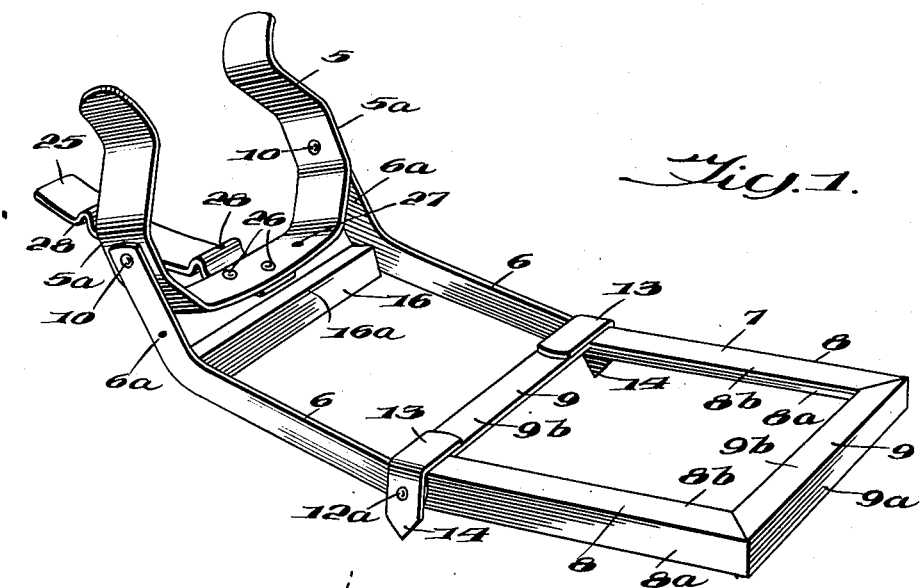
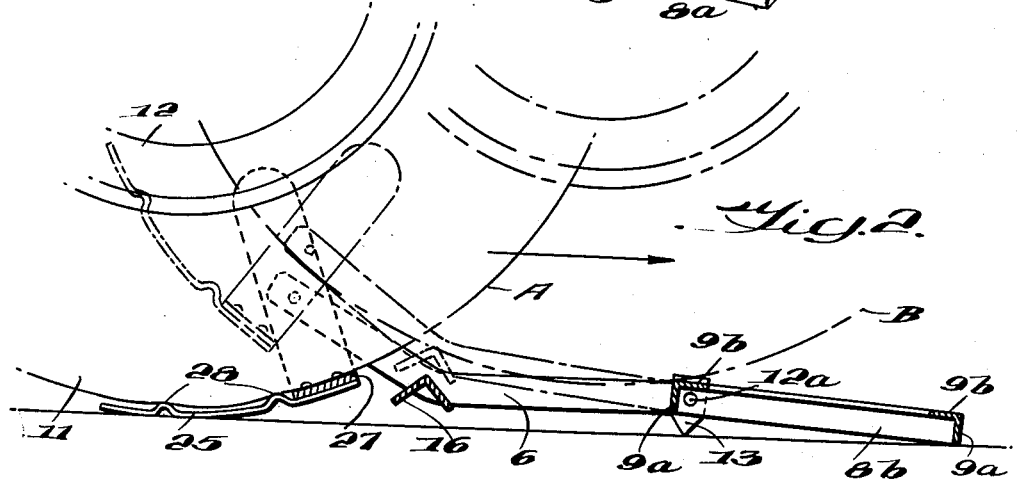
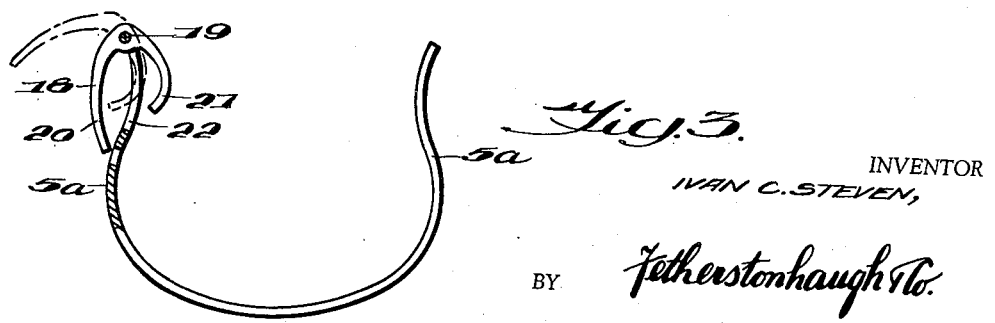
INVENTOR  
IVAN C. STEVEN,  
BY Fetherstonhaugh & Co.  
ATTORNEYS Patented June 8, 1954

2,680,567

UNITED STATES PATENT OFFICE 2,680,567

TRACTION DEVICE FOR USE WITH VEHICLE TIRES

Ivan C. Steven, Mount Royal, Montreal, Quebec, Canada

Application July 22, 1952, Serial No. 300,251

3 Claims. (Cl. 238—14)

This invention is a continuation in part of application Serial No. 148,571, filed March 9, 1950 (now abandoned), and relates to that class of traction devices commonly termed "traction mats," which are laid on the ground to provide traction surfaces or supports over which mired vehicle wheels may readily be driven from the holes, ruts, sand or snow in which they are mired.

Devices of this general type are well known but none have been particularly successful because of their disadvantages in practical applications. For example, some do not have arrangements for gripping the vehicle wheel so that there is no assurance that the wheel will engage and ride over the mat. Others may have gripping arrangements, but have no provision for disengaging the gripping arrangement after the vehicle is driven out of the rut. While still other devices may have disengaging means, the means are complicated and, therefore, uneconomical, difficult to operate, and subject to mechanical failure.

It is an object of the present invention, therefore, to provide a traction device which is rugged, but inexpensive, simple to operate, and well suited for freeing vehicle wheels from ruts and the like.

More particularly, the present invention consists in the provision of a traction device comprising a tire engaging clip and a rigid frame connected together by a pair of links so that, in the use of the device, the clip may be fitted over the tire of a mired wheel with the links and the rigid frame extending from the clip and the wheel in the intended direction of travel of the wheel. Intermediate portions of the links are connected together by a rigid cross member over which the wheel travels onto the rigid frame which constitutes the main traction or supporting surfaces. By virtue of this combination of features, I have provided an exceptionally strong and efficient traction device which is easy to apply; will withstand repeated usage without failure; may be manufactured and sold at a relatively low cost and, when not in use, may be folded to occupy a minimum amount of space by swinging the clip into substantially parallel relation with the links and then swinging the clip and links to a folded position over the rigid frame.

Other characteristic features and advantages of the invention will be more readily apparent from the following detailed description of the preferred embodiment shown in the accompanying drawings, in which—

Figure 1 is a perspective view of my improved traction device.

Figure 2 is a view showing the traction device applied to a vehicle wheel. In this view, the traction device is shown in section and various positions of the wheel and the tire engaging clip are indicated by dotted lines.

Figure 3 is a view partly in edge elevation and partly in vertical section of a tire engaging clip embodying a slight modification as compared with the clip shown in the preceding figures.

As shown in these drawings, my improved traction device comprises a substantially U-shaped tire engaging clip 5 pivotally connected by links 6 to a rigid frame 7 composed of angle iron side members 8 and angle iron end members 9.

Clip 5 is made of spring metal and is positioned between the free ends of links 6 with the side arms 5a of the clip pivotally secured to the links by suitable pivots 10. The side arms of clip 5 are preferably curved as shown in the drawings to snugly fit the tread and sides of the tire 11 of a motor vehicle wheel indicated at 12. The end portions 6a of links 6 adjacent the clip 5 are inclined upwardly so that, when the clip is extending in a vertical direction, the bight 27 of the clip will be on approximately the same level as the horizontal portion 6b of the links, thus preventing the bending of the clip during the operation of the device.

Tire clip 5 is provided with a tongue 25 riveted, or otherwise secured, at 26 to the bight portion 27 of the clip. The tongue 25 has two raised portions 28 which act as friction surfaces engageable by the tire as shown in Figure 2.

Each angle iron side member 8 of frame 7 is arranged to present a vertically disposed leg 8a and a horizontally disposed leg 8b extending inwardly from the upper edge of the vertical leg. Each angle iron end member 9 is arranged to present a vertically disposed leg 9a and a horizontally disposed leg 9b extending from the upper edge of the vertical leg in the direction of the clip 5. The vertical legs of the frame members 8 are welded to the end edges of the vertical legs of the frame members 9 with the horizontal legs 8b of frame members 8 overlapping or abutting and welded to the horizontal legs 9b of frame members 9.

The frame ends of the links 6 are pivotally secured to the frame 7 by pivots 12a passing through the links and through vertically disposed anchor plates 13 which are welded to the vertical legs 8a of frame members 7 at the end of the frame nearest the clip 5. The anchoring plates 13 project downwardly on the outside of links 6 and below the lower edges of the frame members 7 and the lower edges of the links 6 and are provided with pointed ends 14 adapted to be embedded in the ground, ice, or the like.

By locating the anchoring plates 13 on the outside of links 6, it can be seen that it is impossible for the links 6 to be rotated upwardly (clockwise as shown in Figures 1 and 2) with respect to frame 7. This construction is very advantageous as will be shown below.

Intermediate portions of links 6 lying between clip 5 and frame member 7 are rigidly connected together by an angle iron cross member 16 presenting inclined downwardly directed legs which preferably project below the lower edges of links 6 a distance approximately equal to the projection of the anchor plates 13 below said links. The upper corner 16a of angle iron 16 provides an anti-slip friction surface.

My improved anchoring device is used as illustrated in Figure 2. The side arms 5a of clip 5 are fitted over the tire 11 as indicated by the dotted lines with the tongue 25 located along the peripheral surface of the tire. When initially engaged, the tongue, of course, would not be under the tire as shown in Figure 2. The position shown in Figure 2 is that which the tongue assumes after the tire has moved a slight distance in the direction of the arrow to the position indicated by broken lines A. Links 6 and the frame 7 extend from the clip in the direction of travel of the wheel 12, such direction being indicated by the arrow. During its travel toward the frame 7, the wheel 12 reaches a position, indicated by dotted lines B, in which the tire 11 has rolled over the cross member 16 so that the links 6 and the pivotal axis of the clip 5 are prevented from moving with the wheel 12 as the latter travels from the position A to the position B. By the time the wheel reaches the last mentioned position designated B, it has almost completed freeing itself from the clip 5. At this point, the weight of the tire is practically removed from cross member 16. Links 6 engage the horizontal portions of anchoring member 13 and are thus prevented from rotating upwardly and around the tire. Clip 5 is, therefore, forced to be completely disengaged from tire 11 as the tire moves toward the end of frame 7.

The cross member 16a and the anchoring plates 13 are driven into or firmly against the ground by the weight of the vehicle as the wheel 12 travels to a position indicated at A and B.

Figure 3 shows a modified type of clip for attachment to the wheels of automobile trucks. In this case, a clamping lever 18 is pivotally secured to one of the side arms 5a of the clip to increase the tire gripping efficiency of the clip. This clamping lever is mounted to swing about a pivot 19 and includes a handle member 20 and a tire clamping member 21, the latter being movable through a slot 22 in the clip when the clamping lever is swung from the full line to the dotted line position shown in Figure 3 and vice versa.

When not in use, the traction device described herein may be folded to occupy a minimum amount of storage space by first swinging the clip 5 about its pivots 10 to dispose the side arms of the clip parallel or substantially parallel with the links 6 and then swinging the clip and the links counter-clockwise about the pivots 12a to a folded position over frame 7.

Having thus described the nature of my invention and a preferred embodiment thereof, it will be understood that various modifications may be resorted to within the scope and spirit of the invention as defined by the appended claims.

The embodiments of the invention in which an exclusive property or privilege is claimed are defined as follows.

I claim:

1. A traction device for use with a vehicle tire comprising, a rigid frame member, rigid links having corresponding ends thereof pivotally secured to said frame, a tire engaging clip carried by and pivotally secured to corresponding opposite ends of said links at points intermediate the ends and bight portion of said clip, and a rigid cross member extending between and rigidly secured to intermediate portions of said links, said cross member being spaced a substantial distance from said frame to prevent said cross member, by engagement of the tire with said cross member, from being pulled with said clip up around the tire, said spacing enabling the tire to travel from said cross member to said frame member with a portion of the weight of the tire always carried by one of said members, said bight portion swingable in close proximity to said cross member, a lateral portion of said cross member extending below said links to form a member extending below said links to form a load supporting surface with the ground when the tire passes over said cross member.

2. A traction device for use with a vehicle tire comprising, a rigid frame member, rigid links having corresponding ends thereof pivotally secured to said frame, a U-shaped tire engaging clip carried by and pivotally secured to the corresponding opposite ends of said links at points intermediate the ends and bight portion of said clip, and a rigid cross member extending between and rigidly secured to intermediate portions of said links, a portion of said links forward of said cross member being inclined upwardly a distance approximately equal to the distance between the bight portion of said clip and the pivotal connection to said links to cause the bight portion of said clip to be on approximately the same level as said cross member when said clip is in a substantially vertical position.

3. A traction device for use with a vehicle tire comprising, a rigid frame member, rigid elongated link members having corresponding ends thereof pivotally secured to said frame, a U-shaped tire engaging clip carried by and pivotally secured to the corresponding opposite ends of said link member, and a rigid cross member extending between and rigidly secured to intermediate portions of said link members, said clip being formed of spring steel, and said frame including a bar parallel to said cross member and rigidly attached to said frame structure at the clip end thereof, said cross member being spaced a substantial distance from said bar to prevent said cross member, by the engagement of said tire with said cross member, from being pulled with said clip up around said tire, whereby the tire, having been engaged by said clip, will move toward said frame, over said cross member and onto said bar, forcing said clip to be disengaged from said tire.

References Cited in the file of this patent

UNITED STATES PATENTS

| Number | Name | Date |
|--------|------|------|
| 1,243,546 | Pattison | Oct. 16, 1917 |
| 1,482,382 | Carlson | Feb. 5, 1924 |
| 1,574,729 | Foster | Feb. 23, 1926 |
| 1,732,975 | Lindner | Oct. 22, 1929 |